United States Patent [19]
Krieger

[11] Patent Number: 5,210,408
[45] Date of Patent: May 11, 1993

[54] ROTATABLE ELECTRO-OPTIC MEASUREMENT TAPPING DEVICE

[75] Inventor: Dietmar Krieger, Zorneding, Fed. Rep. of Germany

[73] Assignee: Messerschmitt-Bolkow-Blohm GmbH, Fed. Rep. of Germany

[21] Appl. No.: 779,337

[22] Filed: Oct. 18, 1991

[30] Foreign Application Priority Data

Nov. 3, 1990 [DE] Fed. Rep. of Germany ....... 4034980

[51] Int. Cl.⁵ .................................................. G01D 5/34
[52] U.S. Cl. ............................... 250/231.12; 74/5.6 A
[58] Field of Search ................... 250/231.12, 231.13, 250/208.6, 237 G, 227.11, 227.21, 227.28, 227.30; 114/24, 121, 122; 33/324, 236; 74/5.6 A

[56] References Cited
U.S. PATENT DOCUMENTS

| | | | |
|---|---|---|---|
| 4,339,959 | 7/1982 | Klaus, Jr. et al. | 74/5.6 A |
| 4,361,760 | 11/1982 | Rodgers | 250/231.12 |
| 4,371,784 | 2/1983 | Rodgers | 74/5.6 A |
| 5,113,065 | 5/1992 | Heynau | 250/208.6 |

*Primary Examiner*—David C. Nelms
*Assistant Examiner*—K. Shami
*Attorney, Agent, or Firm*—Evenson, McKeown, Edwards & Lenahan

[57] ABSTRACT

The electro-optic measurement tapping device for a motion sensor movably arranged in a receptacle which can be rotated about a shaft, the deflection of the motion sensor from an initial position being detected and measured. The motiond detector has, on a side facing the rotating shaft of the receptacle, a scale provided with different optical characteristics in code form. In an axial bore of the rotating shaft, at least one fiber-optical light guide is arranged, one end of which is directed to the scale and the other end of which is directed to an electro-optic component, the electro-optic component being fixedly connected with a housing part bearing the rotating shaft of the receptacle.

12 Claims, 3 Drawing Sheets

ROTATABLE ELECTRO-OPTIC MEASUREMENT TAPPING DEVICE

BACKGROUND AND SUMMARY OF THE INVENTION

The present invention relates to a rotatable electro-optic measurement tapping device for a measured-variables transmitter. The transmitter is movably arranged in a receptacle which can be rotated about a shaft, the deflection of the measured-variables transmitter from an initial position being detected as the measured-variables value.

Rotatable electro-optic measurement tapping devices using beam waveguides (also known as "optical slip rings") are known per se. One such device, for example, is disclosed in German Patent Document DE 34 20 154 A1. However, devices of this type are suitable only for the transmission of signals from a movable to a fixed device component. If the movable component from which signals are to be transmitted is arranged in another receptacle which is also movable with respect to a fixed housing part, an additional separate transmission path would have to be provided.

It is therefore an object of the present invention to provide a simple and inexpensive rotatable electro-optic measurement tapping device for a measured-variables transmitter which is movably arranged in a receptacle that can be rotated about a shaft, and by means of which the deflection of the measured-variables transmitter from an initial position is detected without contact, and is transmitted. In particular, the measurement tapping device according to the invention is suitable for measuring the deflection of an interior frame of a cardanically mounted gyroscope.

This object is achieved by a rotatable electro-optic measurement tapping device according to the invention in which an optically encoded scale is affixed to the gyroscope frame for sensing movement relative to the receptacle in which it is mounted, and a second optically encoded scale is affixed to a housing to sense relative rotational movement between the housing and the receptacle, with light from a light source being directed against the scales by an axially mounted fiber optic light guide.

Other objects, advantages and novel features of the present invention will become apparent from the following detailed description of the invention when considered in conjunction with the accompanying drawings.

BRIEF DESCRIPTION OF THE DRAWINGS

FIG. 2b is a view of the end faces of the beam waveguide according to FIG. 2a;

DETAILED DESCRIPTION OF THE DRAWINGS

Figure 1:
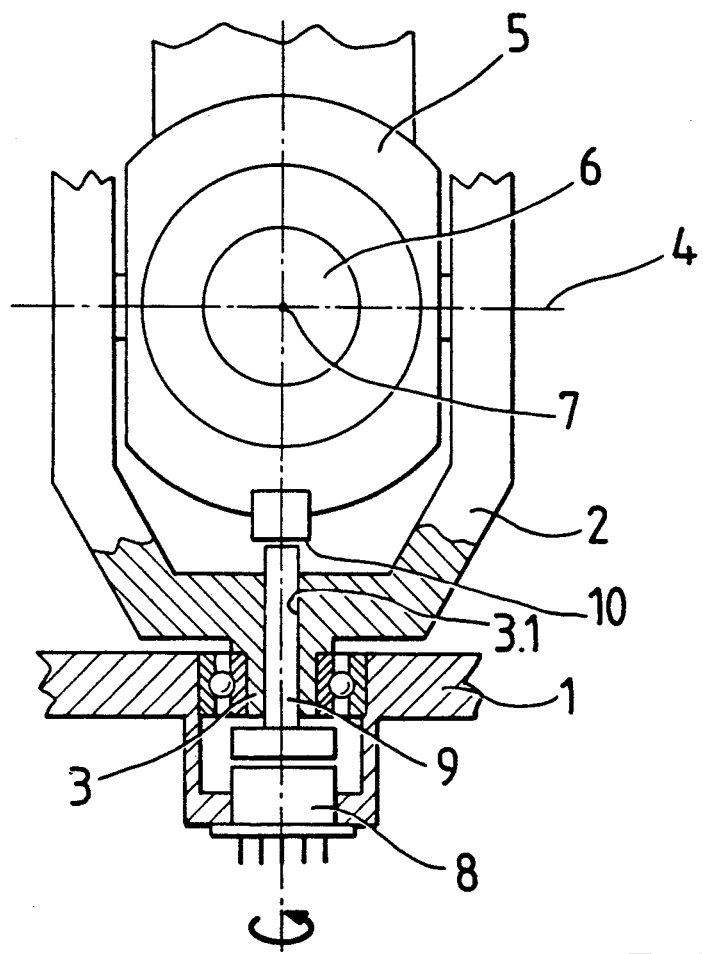
FIG. 1 is a partially cross sectional view of an electro-optic measurement tapping device for the interior frame of a cardanically mounted gyroscope.

In the embodiment illustrated in FIG. 1, the exterior frame 2 of a gyroscope is disposed rotatably about a shaft 3 in a housing part 1. The exterior frame 2 forms the receptacle for an interior frame 5 which can be rotated about an axis 4 and which, in turn, carries the gyro rotor 6. The rotor axis 7, the axis of rotation 4 of the interior frame 5 as well as the rotating shaft 3 of the exterior frame 2 are each disposed vertically on top of one another. When the gyroscope is mounted in a missile, the rotating shaft 3 is aligned in the housing in such a manner that it represents the roll axis. Yawing movements of the missile will then result in a swivelling of the interior frame 5, the deflection of which is detected and, in a no-contact manner and is transmitted to an electro-optic component 8 which is fixedly connected with the housing 1.

Figure 2A:
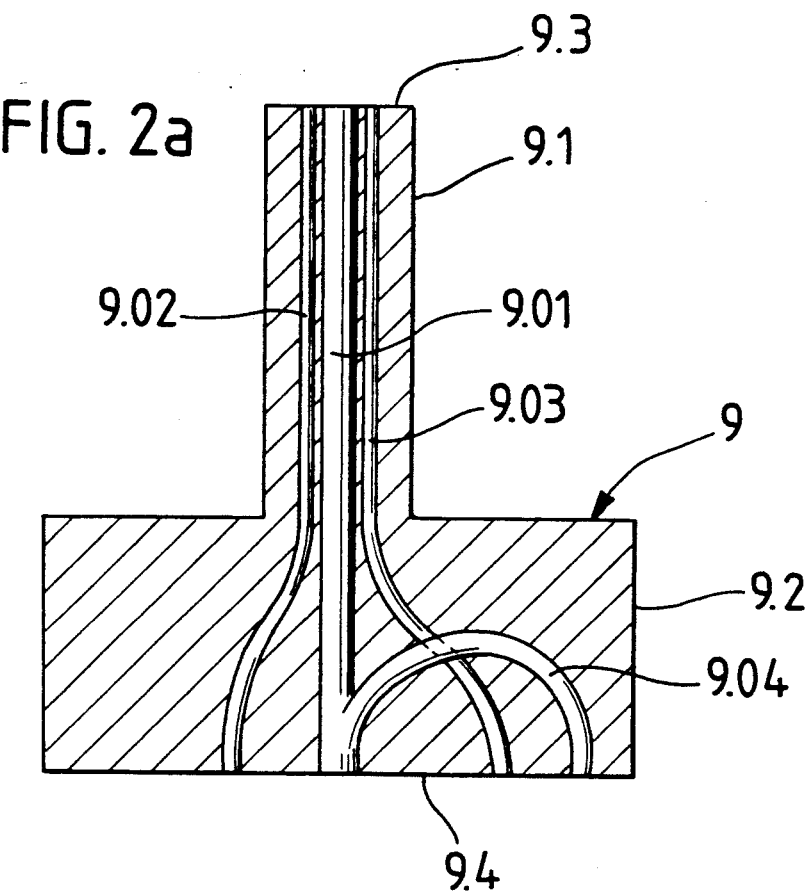
FIG. 2a is a cross-sectional view of a beam waveguide for the optical connection between the interior frame of the gyroscope and an electro-optic component.
Figure 2B:
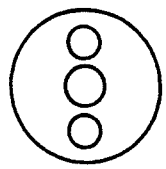

For this purpose, a fiber-optic light guide 9, which is illustrated in detail in FIGS. 2a and b, is arranged in a bore 3.1 which extends coaxially with respect to the rotating shaft 3 and rotates therewith. The fiber-optic light guide 9 comprises a cylindrical shaft 9.1, the outside diameter of which corresponds to the inside diameter of the bore 3.1, and a second cylindrical part 9.2, the outside diameter corresponds approximately to that of the electro-optic component 8. In the interior of the fiber-optic light guide 9, a first optical fiber 9.01 is arranged exactly in the center along the axis of symmetry, with its ends leading to the faces 9.3 and 9.4 of the fiber-optic light guide 9. On both sides of the optical fiber 9.01, thus next to the axis of symmetry, there extend two additional optical fibers 9.02 and 9.03 which exit the face 9.3 of cylinder 9.1 as closely as possible to the first optical fiber 9.01. (See FIG. 2b.) On face 9.4, fibers 9.02 and 9.03 emerge at larger varying distances from the central optical fiber 9.0 (as seen in FIG. 2b). In addition, a fourth optical fiber 9.04 is provided in the proximity of face 9.04, which is coupled with the central optical fiber 9.01 and exits face 9.4 at an even larger distance than the optical fiber 9.03.

Figure 3:
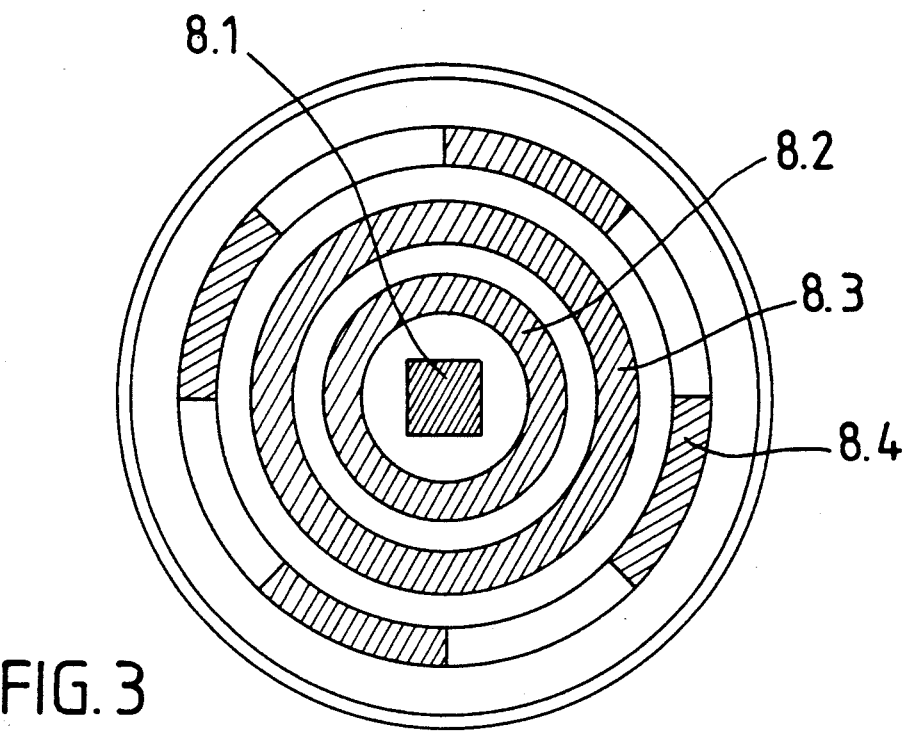
FIG. 3 is a view of the electro-optic component with the transmitting and receiving surfaces.

The function of the fiber-optic light guide 9 will now be explained in connection with the construction of the electro-optic transducer 8, of which a top view is shown in FIG. 3.

Figure 4:
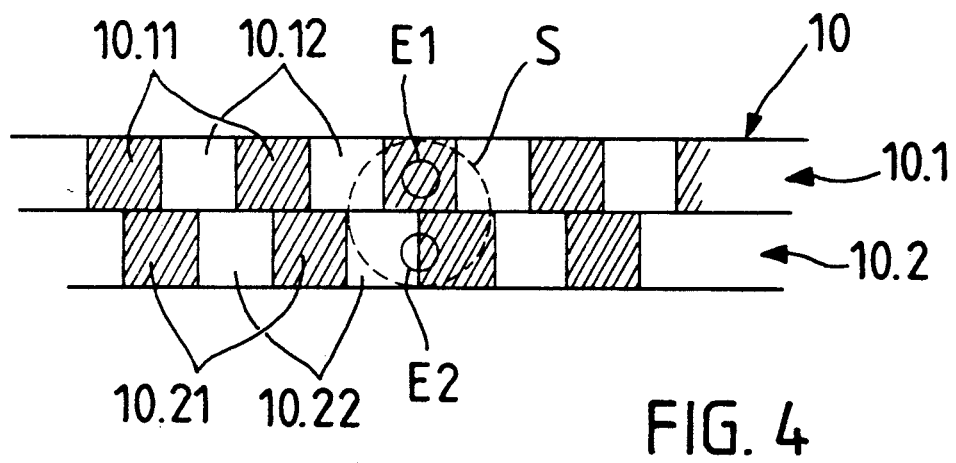
FIG. 4 is a view of a two-part coded graduated scale.

A centrally arranged light source 8.1, such as a light-emitting diode, is assigned to the first optical fiber 9.01. By way of the optical fiber 9.01, the light of the light-emitting diode 8.1 is directed onto a graduated scale 10 which is illustrated in FIG. 4 and will later be explained in detail. By way of the two optical fibers 9.02 and 9.03 light reflected by the graduated scale 10 is directed to different detectors 8.2 and 8.3 of the electro-optic component 8, with ring-shaped light detecting surfaces. By way of the optical fiber 9.04, a portion of the light guided in the central fiber 9.01 is directed to another detector 8.4 with a ring-shaped detecting surface. As shown in FIG. 3, cross hatched areas of rings 8.2, 8.3 and 8.4 represent light sensitive detecting surfaces, while the non hatched areas are inactive; that is, do not generate signals in response to light impinging thereon.

Rotation of the receptacle 2 about the shaft 3 does not alter the signals guided by way of the optical fibers 9.02 and 9.03 onto the receiving surfaces 8.2 and 8.3 because the light guide rotates with the receptacle. In contrast, the angular position of the holding device 2 with respect to the housing 1 is registered by the segmented ring area 8.4, the resolution of this angular position being determined by the number of segments into which it is divided. That is, as the receptacle is rotated, the light directed onto ring 8.4 by optical fiber 9.04 passes alternately over the light sensing and inactive surfaces, thus generating a series of electrical pulses which can be counted in a conventional manner to derive an indication of the extent of such rotation.

However, when the frame 5 is deflected, the graduated scale 10 passes in front of the face 9.3 of the fiber-optical light guide 9 which results in phase differentiated modulation of the light reflected by the scale parts 10.1 and 10.2 into the optical fibers 9.2 and 9.3. As shown in FIG. 4, the central optical fiber 9.01 illuminates the two scale parts 10.1 and 10.2 within a circular surface S. A receiving surface E1 of the optical fiber 9.02 is assigned to the graduated scale 10.1, and a receiving surface E2 of the optical fiber 9.03 is assigned to the graduated scale 10.2, which with respect to the scale part or scale parts 10.1 and 10.2 are arranged next to one another at the same level. The two scale parts 10.1 and 10.2 have a pattern of alternately absorbing surfaces 10.1, 10.2 and reflecting surfaces 10.12, 10.22, with the two scale parts 10.1 and 10.2 being arranged offset with respect to one another by half the length of such a surface. During the relative movement of the graduated scale 10 with respect to the fiber-optic light guide 9, the light transmitted back by way of the optical fiber 9.02 and 9.03 to the electro-optic component 8 is modulated with a variable phase. The extent of the deflection is measured by pulse counting of the signals generated on the receiving surface 8.2 in a conventional manner. The direction of the deflection is detected by phase comparison with the pulses on the receiving surface 8.3.

The measurement tapping according to the invention therefore permits the signal transmission between two parts which can be rotated about different shafts. Analogous applications are conceivable, for example, in the case of machine tools.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A rotatable electro-optic measurement tapping arrangement for sue with a motion sensor for measuring deflection of said motion sensor form a starting position, said arrangement comprising:
   a receptacle, in which said motion sensor is movably arranged, said receptacle being rotatable about a shaft;
   a scale affixed to a side of said motion sensor facing said shaft, said scale comprising an optically encoded pattern; and
   a fiber-optic light guide arranged in an axial bore of said shaft, a first end of said light guide being directed to the scale and a second end of said light guide being directed to an electro-optic component affixed to a housing bearing said shaft of the receptacle;
   wherein said electro-optic component comprises least one photosensitive detector with a ring-shaped receiving surface arranged concentrically with respect to the rotating shaft of the receptacle, and a light source arranged in the center of said ring shaped receiving surface; and
   wherein said electro-optic component comprises at least one additional detector with a ring-shaped receiving surface divided into active and nonactive segments.

2. A rotatable electro-optic measurement tapping arrangement for use with a motion sensor for measuring deflection of said motion sensor from a starting position, said arrangement comprising:
   a receptacle, in which said motion sensor is movably arranged, said receptacle being rotatable about a shaft;
   a scale affixed to a side of said motion sensor facing said shaft, said scale comprising an optically encoded pattern; and
   a fiber-optic light guide arranged in an axial bore of said shaft, a first end of said light guide being directed to the scale and a second end of said light guide being directed to an electro-optic component affixed to a housing bearing said shaft of the receptacle;
   wherein said light guide in the bore of the receptacle shaft has an axially extending first optical fiber and at least one eccentrically extending second optical fiber, said axially extending optical fiber being optically coupled to a light source and said eccentrically extending second optical fiber being coupled to a photosensitive detector of the electro-optic component;
   wherein said electro-optic component comprises least one photosensitive detector with a ring-shaped receiving surface arranged concentrically with respect to the rotating shaft of the receptacle, and a light source arrange din the center of said ring shaped receiving surface; and
   wherein said electro-optic component comprises at least one additional detector with a ring-shaped receiving surface divided into active and nonactive segments.

3. A rotatable electro-optic measurement tapping arrangement for use with a motion sensor for measuring deflection of said motion sensor from a starting position, said arrangement comprising:
   a receptacle, in which said motion sensor is movably arranged, said receptacle being rotatable about a shaft;
   a scale affixed to a side of said motion sensor facing said shaft, said scale comprising an optically encoded pattern; and
   a fiber-optic light guide arranged in an axial bore of said shaft, a first end of said light guide being directed to the scale and a second end of said light guide being directed to an electro-optic component affixed to a housing bearing said shaft of the receptacle; and
   wherein said light guide has two eccentrically extending second optical fibers arranged on opposite sides of said first optical fiber, said receptive second optical fibers providing optical coupling between first and second portions of the coded scale on the measurement sensor and two photosensitive detectors of said electro-optic component, each assigned to a portion of said scale and each having a ring-shaped receiving surface.

4. A rotatable electro-optic measurement tapping arrangement for sue with a motion sensor for measuring deflection of said motion sensor from a starting position, said arrangement comprising:
   a receptacle, in which said motion sensor is movably arranged, said receptacle being rotatable about a shaft;

a scale affixed to a side of said motion sensor facing said shaft, said scale comprising an optically encoded pattern; and a fiber-optic light guide arranged in an axial bore of said shaft, a first end of said light guide being directed to the scale and a second end of said light guide being directed to an electro-optic component affixed to a housing bearing said shaft of the receptacle;

wherein said light guide in the bore of the receptacle shaft has an axially extending first optical fiber and at least one eccentrically extending second optical fiber, said axially extending optical fiber being optically coupled to a light source, and eccentrically extending optical fiber being coupled to a photosensitive detector of the electro-optic component; and wherein said light guide has two eccentrically extending second optical fibers arranged on opposite sides of said first optical fibers, said respective second optical fibers providing optical coupling between first and second portions of the coded scale on the measurement sensor and two photosensitive detectors of said electro-optic component, each assigned to a portion of said scale and each having a ring-shaped receiving surface.

5. A rotatable electro-optic measurement tapping arrangement for sue with a motion sensor for measuring deflection of said motion sensor from a starting position, said arrangement comprising:

a receptacle, in which said motion sensor is movably arranged, said receptacle being rotatable about a shaft;

a scale affixed to a side of said motion sensor facing said shaft, said scale comprising an optically encoded pattern; and a fiber-optic light guide arranged in an axial bore of said shaft, a first end of said light guide being directed to the scale and a second end of said light guide being directed to an electro-optic component affixed to a housing bearing said shaft of the receptacle;

wherein said electro-optic component comprises least one photosensitive detector with a ring-shaped receiving surface arranged concentrically with respect to the rotating shaft of the receptacle, and a light source arranged in the center of said ring shaped receiving surface; and wherein said light guide has two eccentrically extending second optical fibers arranged on opposite sides of said first optical fibers, said respective second optical fibers providing optical coupling between first and second portions of the coded scale on the measurement sensor and two photosensitive detectors of said electro-optic component, each assigned to a portion of said scale and each having a ring-shaped receiving surface.

6. A rotatable electro-optic measurement tapping arrangement for use with a motion sensor for measuring deflection of said motion sensor form a starting position, said arrangement comprising:

a receptacle, in which said motion sensor is movably arranged, said receptacle being rotatable about a shaft;

a scale affixed to a side of said motion sensor facing said shaft, said scale comprising an optically encoded pattern; and a fiber-optic light guide arranged in an axial bore of said shaft, a first end of said light guide being directed to the scale and a second end of said light guide being directed to an electro-optic component affixed to a housing bearing said shaft of the receptacle;

wherein said light guide in the bore of the receptacle shaft has an axially extending first optical fiber and at least one eccentrically extending second optical fiber, said axially extending optical fiber being optically coupled to a light source and said eccentrically extending second optical fiber being coupled to a photosensitive detector of the electro-optic component;

wherein said electro-optic component comprises least one photosensitive detector with a ring-shaped receiving surface arranged concentrically with respect to the rotating shaft of the receptacle, and a light source arranged in the center of said ring shaped receiving surface; and wherein said light guide has two eccentrically extending second optical fibers arranged on opposite sides of said first optical fibers, said respective second optical fibers providing optical coupling between first and second portions of the coded scale on the measurement sensor and two photosensitive detectors of said electro-optic component, each assigned to a portion of said scale and each having a ring-shaped receiving surface.

7. An electro-optic measurement tapping arrangement device according to claim 2, wherein said light guide has two eccentrically extending second optical fibers arranged on opposite sides of said first optical fiber, said respective second optical fibers providing optical coupling between first and second portions of the coded scale on the measurement sensor and two photosensitive detectors of said electro-optic component, each assigned to a portion of said scale and each having a ring shaped receiving surface.

8. A rotatable electro-optic measurement tapping arrangement for use with a motion sensor for measuring deflection of said motion sensor form a starting position, said arrangement comprising:

a receptacle, in which said motion sensor is movably arranged, said receptacle being rotatable about a shaft;

a scale affixed to a side of said motion sensor facing said shaft, said scale comprising an optically encoded pattern; and a fiber-optic light guide arranged in an axial bore of said shaft, a first end of said light guide being directed to the scale and a second end of said light guide being directed to an electro-optic component affixed to a housing bearing said shaft of the receptacle;

wherein the ring-shaped receiving surface of the detector is divided into active and non-active segments is connected by way of an optical fiber directly with the central first optical fiber.

9. A rotatable electro-optic measurement tapping arrangement for use with a motion sensor for measuring deflection of said motion sensor form a starting position, said arrangement comprising:

a receptacle, in which said motion sensor is movably arranged, said receptacle being rotatable about a shaft;

a scale affixed to a side of said motion sensor facing said shaft, said scale comprising an optically encoded pattern; and a fiber-optic light guide arranged in an axial bore of said shaft, a first end of said light guide being directed to the scale and a second end of said light guide being directed to an electro-optic component affixed to a housing bearing said shaft of the receptacle;

wherein said electro-optic component comprises least one photosensitive detector with a ring-shaped receiving surface arranged concentrically with respect to the rotating shaft of the receptacle, and a light source arranged in the center of said ring shaped receiving surface; and wherein the ring-shaped receiving surface of the detector divided into active and non-active segments is connected by way of an optical fiber directly with the central first optical fiber.

10. An electro-optic measurement tapping arrangement device according to claim 1, wherein the ring-shaped receiving surface of the detector divided into active an non-active segments is connected by way of an optical fiber directly with the central first optical fiber.

11. An electro-optic measurement tapping arrangement device according to claim 3, wherein the ring-shaped receiving surface of the detector divided into active an non-active segments is connected by way of an optical fiber directly with the central first optical fiber.

12. An electro-optic measurement tapping arrangement device according to claim 3, wherein each of said first and second portions of said scale has a uniform linear pattern of reflecting and absorbing surface elements, the two portions being arranged next to one another and offset by half the length of a surface element.

* * * * *